United States Patent
Xin et al.

(10) Patent No.: US 12,253,861 B2
(45) Date of Patent: Mar. 18, 2025

(54) MULTI-MACHINING ROBOT COLLABORATION METHOD IN FLEXIBLE HARDWARE PRODUCTION WORKSHOP

(71) Applicant: BEIJING INSTITUTE OF TECHNOLOGY, Beijing (CN)

(72) Inventors: Bin Xin, Beijing (CN); Sai Lu, Beijing (CN); Lihua Dou, Beijing (CN); Jie Chen, Beijing (CN); Qing Wang, Beijing (CN); Miao Wang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 243 days.

(21) Appl. No.: 18/097,833

(22) Filed: Jan. 17, 2023

(65) Prior Publication Data

US 2023/0229172 A1    Jul. 20, 2023

Related U.S. Application Data

(63) Continuation of application No. PCT/CN2021/100899, filed on Jun. 18, 2021.

(30) Foreign Application Priority Data

Jul. 17, 2020   (CN) .......................... 202010695931.3

(51) Int. Cl.
G05B 19/41        (2006.01)
G05B 19/4155      (2006.01)
G05D 1/00         (2006.01)

(52) U.S. Cl.
CPC ....... G05D 1/0297 (2013.01); G05B 19/4155 (2013.01); *G05B 2219/40078* (2013.01); *G05B 2219/50391* (2013.01)

(58) Field of Classification Search
CPC .............. G05D 1/0297; G05B 19/4155; G05B 2219/40078; G05B 2219/50391
See application file for complete search history.

*Primary Examiner* — Mathew Franklin Gordon
(74) *Attorney, Agent, or Firm* — Yong Chen

(57) ABSTRACT

A multi-robot collaboration method in a flexible hardware production workshop is provided, by which allocation of workpiece machining tasks and transfer of workpieces in different workstations can be achieved and meanwhile relatively high calculation cost is avoided. According to the method, a distributed collaboration method is fully used, and in allusion to the current technical condition, the allocation of the workpiece machining tasks and the transfer of the workpieces in different workstations can be achieved and meanwhile the relatively high calculation cost is avoided. A multi-AGV path conflict eliminating method is used for avoiding possible collision of AGVs during movement. A centralized intervention and adjustment method is used for discovering and predicting system conflicts and failure problems and making timely dispatching and adjustment so as to improve the automation level and the flexibility level of a hardware workshop.

5 Claims, 6 Drawing Sheets

MULTI-MACHINING ROBOT COLLABORATION METHOD IN FLEXIBLE HARDWARE PRODUCTION WORKSHOP

CROSS REFERENCE TO RELATED APPLICATIONS

This application is a continuation of International Patent Application No. PCT/CN2021/100899, filed Jun. 18, 2021, which claims priority to Chinese Patent Application No. 202010695931.3, filed Jul. 17, 2020, the disclosure of each of which is incorporated herein by reference in its entirety.

FIELD

The present disclosure relates to the technical field of multi-intelligent agent collaboration, in particular to a multi-machining robot collaboration method in a flexible hardware production workshop.

BACKGROUND

The current hardware industry faces challenges such as product diversification, small batch and rapid market demand change; however, the traditional production mode has a low automation level and is difficult in meeting the small-batch and multiple-batch rapid production line switching need, so that improvement on the automation level and the intelligence level is urgent. A modularized hardware production workshop can well adapt to changing and flexible production needs. The machining robots in the modularized hardware workshop can realize rapid line switching flexible production of multiple varieties of products in multiple working processes only by changing tools, fixtures and a small number of process modules.

In a multi-machining robot collaboration system in the modularized workshop, many difficulties also exist in communication and coordination among large-scale machining robots. At present, in allusion to a multi-machining robot collaboration technology, centralized and distributed control methods are mainly included; according to the centralized method, the central management node with relatively strong computing power is mainly relied on to process a large amount of complicated internal information of the workshop, and dispatching and control of all the intelligent agents in the workshop are realized through a flexible and efficient planning algorithm; according to the distributed method, the autonomous perception, communication and decision-making capabilities of the intelligent machining robots are mainly relied on, and by certain task allocation methods (such as a method based on the market mechanism), efficient collaboration of distributed self-organizations in the workshop is realized. The above methods have respective advantages and disadvantages. In the centralized method, the central management node is relied on too much, and once the central management node is paralyzed, the workshop cannot continue the machining task; however, for the distributed method, although the reliance on the central management node is relatively low, problems such as congestion and collision are prone to occur in the workshop since each intelligent agent can only obtain local information.

At present, researchers have done in-depth research on the task allocation method of the machining robots in the workshop and have applied for a large number of intellectual property rights; however, most of the research researches a centralized dynamic dispatching method based on isostructural automated guided vehicles (Automated Guided Vehicle, shortened as AGV); although some of the research involves distributed dynamic task allocation, the research is still limited to the task allocation of the AGVs; for machining of multi-variety and small-batch products in the flexible hardware workshop, various conflicts and failures are prone to occur in the complicated workshop environment.

SUMMARY

In view of above situation, the present disclosure provides a multi-machining robot collaboration method in a flexible hardware workshop, by which the allocation of workpiece machining tasks and transfer of workpieces in different workstations can be achieved and meanwhile relatively high calculation cost is avoided.

In order to achieve the above purposes, the present disclosure adopts the technical solution as follows:

a multi-machining robot collaboration method in a flexible hardware production workshop adopts a machining robot collaboration system for achieving collaboration, wherein the multi-machining robot collaboration system gathers status information of each machining robot to a central management node in real time by using a bus; each machining robot and AGVs realize event-driven communication and information sharing in a wireless local area network environment so as to complete task allocation.

The multi-machining robot collaboration method in the flexible hardware production workshop includes the following steps:

step 1, generating a workpiece machining task for machining a batch of workpieces, wherein the batch of workpieces includes multiple different varieties of to-be-machined workpieces;

step 2, performing machining task allocation by the central management node, wherein machining task allocation includes the following substeps:

step 2.1, sending a workpiece machining task request to the other machining robots in sequence by a machining task sender according to a task machining priority sequence of the information of a to-be-machined task through a communication network;

step 2.2, after the workpiece machining task request information is received, predicting a completion time of a corresponding task in the request information in combination with the task sequence in a current own task list and sending the expected completion time of the task to the machining task sender by the machining robots;

Step 2.3, allocating a task package to the machining robot feeding back the shortest expected completion time in priority according to the feedback information of each machining robot and sending corresponding confirmation information to the machining robot by the machining task sender; and step 2.4, after the confirmation information is received, inserting the task into the task list according to the priority sequence and recalculating the expected completion time of each task by the machining robot, wherein the machining robots which do not receive the confirmation information maintain original statuses;

step 3, gathering the workpieces to be machined in sequence according to the machining task priority sequence, wherein a transferring task allocation method includes the following substeps:

step 3.1, reading the machining task in the task list and sending transferring request information of the task to surrounding AGVs through a local communication network by the machining robot;

step 3.2, after the transferring request information is received, calculating an expected completion time of the transferring task according to own position information, material-taking position information and material-sending position information and sending the expected time as return information to the task sender by the idle AGVs in the local communication network;

step 3.3, preferentially selecting the AGV feeding back the shortest expected completion time according to the fed-back response information and sending confirmation information to the AGV by the machining robot; and step 3.4, after the confirmation information is received, transferring the material to be machined from a discharging buffer zone of the machining robot in the previous working process to a feeding buffer zone of the corresponding machining robot in the current working process by the AGV according to the task information, wherein the AGVs which do not receive the confirmation information within a certain period of time continue to wait for receiving other transferring task requests;

step 4, after the workpiece to be machined is received, starting to machine the workpiece according to the corresponding working process by the machining robot, and after the machining robot completes the machining task in the working process, performing the next machining task allocation operation, wherein the machining task allocation operation includes the following substeps:

step 4.1, judging whether all the machining working processes of the machined workpiece are completed; if so, executing a step 5, namely collecting the AGV to transfer the workpiece to a finished product zone for warehousing and ending the machining task; otherwise, sending a workpiece machining task request for the next working process to other surrounding machining robots;

step 4.2, sending a workpiece machining task request to the other machining robots in the workshop in sequence according to the task machining priority sequence of the information of the to-be-machined task by the machining robot;

step 4.3, after the workpiece machining task request information is received, predicting the completion time of the corresponding task in the request information in combination with the task sequence in the current own task list and sending the expected completion time of the task to a task request sender by the machining robot capable of completing the machining task in the working process;

step 4.4, allocating the task package to the machining robot feeding back the shortest completion time in priority according to the feedback information of each machining robot and sending corresponding confirmation information to the machining robot by the sender; and step 4.5, after the confirmation information is received, inserting the task into the task list according to the priority sequence and recalculating the expected completion time of each task by the machining robot, and going to the step 3;

step 5, after the last workpiece machining working process is completed, completing workpiece warehousing transferring task allocation by the machining robot, wherein workpiece warehousing transferring task allocation includes the following substeps:

step 5.1, sending a workpiece warehousing transferring request to surrounding AGVs through the local communication network by the machining robot;

step 5.2, after the transferring request information is received, calculating the expected completion time of the transferring task according to own position information, material-taking position information and material-sending position information and sending the expected time as return information to the task sender by the idle AGVs in the local communication network;

step 5.3, preferentially selecting the AGV feeding back the shortest completion time according to the fed-back response information and sending confirmation information to the AGV by the machining robot; and step 5.4, after the confirmation information is received, autonomously transferring the finished workpiece to a finished product zone according to the task information by the AGV to complete all the machining tasks of the workpiece.

The multi-machining robot collaboration method in the flexible hardware production workshop further includes a multi-AGV path conflict eliminating method, wherein the multi-AGV path conflict eliminating method includes the following substeps:

step 6.1, sharing own position information, partial path information and own task priority information with the surrounding AGVs through the local communication network by the AGV in the flexible production workshop during movement; and step 6.2, after the shared information from the surrounding AGVs is received, comparing the shared information with the own position information and path information by the AGV so as to judge whether a path conflict problem appears;

if the path conflict problem appears between the AGV itself and another AGV, firstly judging the respective task priority sequences; if the priority of the AGV itself is higher than that of another AGV, ignoring the conflict problem; if the priority of the AGV itself is lower than that of another AGV, taking an avoiding measure to let the AGV with the higher priority pass through a path with a conflict.

Adopting a centralized intervention and dispatching method for discovering and predicting system conflicts and failure problems includes the following substeps:

step 7.1, collecting information from the inside of the workshop in real time by the central management node through an industrial field bus, wherein the information comprises the status information of all the machining robots and all the AGVs and the environmental condition;

step 7.2, performing centralized analysis and processing on the information collected in the step 7.1 so as to discover and predict workshop failures which are occurring or likely to occur in the future, wherein the failures include machining robot failures in the workshop, obstacles in the workshop and traffic congestion; and step 7.3, according to the result of the step 7.2, adopting a dispatching strategy by the central management node for adjusting internal parameters, a task list and current status information of each current intelligent agent so as to eliminate the workshop failures which are occurring or likely to occur in the future by changing the production and operation status of the workshop in a minimum range.

The machining task sender is the central management node or the machining robot.

Beneficial effects are as follows:

According to the method in the present disclosure, a distributed collaboration method is fully used, and in allusion to the current technical condition, the allocation of the workpiece machining tasks and the transfer of the workpieces in different workstations can be achieved and meanwhile the relatively high calculation cost is avoided.

In the present disclosure, a multi-AGV path conflict eliminating method is adopted for avoiding possible collision of AGVs during movement.

In the present disclosure, a centralized intervention and adjustment method is used for discovering and predicting system conflicts and failure problems and making timely dispatching and adjustment so as to improve the automation level and the flexibility level of a hardware workshop.

DETAILED DESCRIPTION OF THE EMBODIMENTS

Now, the present disclosure is further described in detail in combination with the drawings.

According to the multi-machining robot collaboration method in the flexible hardware workshop, provided by the present disclosure, the machining robot is taken as a leading initiator for main machining tasks and transferring tasks in the workshop, and rapid allocation and implementation of the tasks are realized through communication and collaboration with various surrounding machining robots; through comprehensive use of a distributed collaboration method, a centralized intervention and dispatching method and the like, a variety of possible failures and congestion problems in the workshop are solved, so that the flexibility level and the automation level of the system are improved. Particularly, based on the modularized flexible production workshop including multiple varieties of machining robots and AGVs, the present disclosure researches a distributed task allocation method of the above various machining robots. Through application of the distributed collaboration method in the present disclosure, flexible machining of multiple varieties of workpieces and flexible transfer of materials between the working processes are realized, so that the production flexibility and the expansibility of the production workshop are greatly improved.

Figure 1:
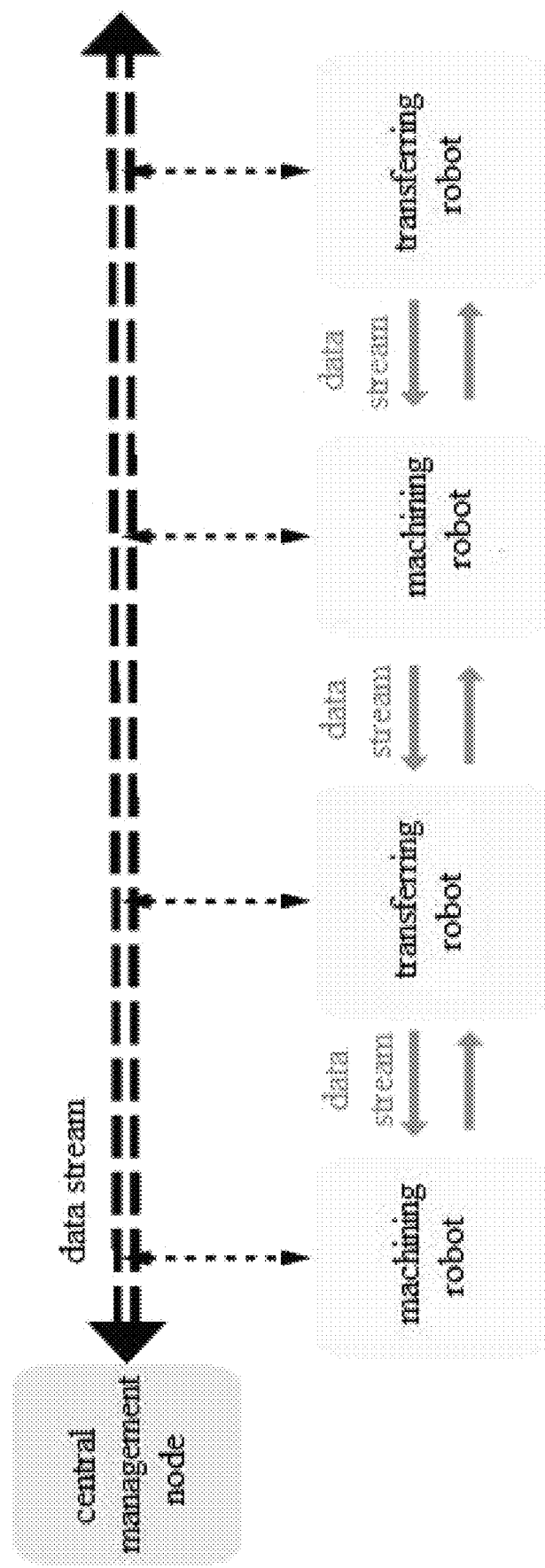
FIG. 1 is a communication topology diagram for the flexible hardware workshop in the present disclosure.

The communication topology diagram for the flexible hardware workshop in the present disclosure is shown in the FIG. 1. There are three types of nodes with communicating and decision-making capabilities: the central management node, the transferring machining robots and the machining robots respectively. The central management node is linked with the other nodes through the communication networks such as the industrial bus; various machining robots and the transferring machining robots carry out local self-organization linking in a flexible communication way so as to complete information exchange and sharing. The flexible hardware workshop mainly includes three types of intelligent agents with decision-making capabilities: the central management node, the machining robots and the AGVs. The central management node maintains real-time communication with the machining robots and the AGVs through the communication technologies such as the industrial field bus; the machining robots and the AGVs achieve local low-frequency information interaction through the Bluetooth or WLAN communication technology; therefore, the information network architecture of the flexible hardware workshop is constituted, which provides the communication basis for the machining tasks.

Figure 2:
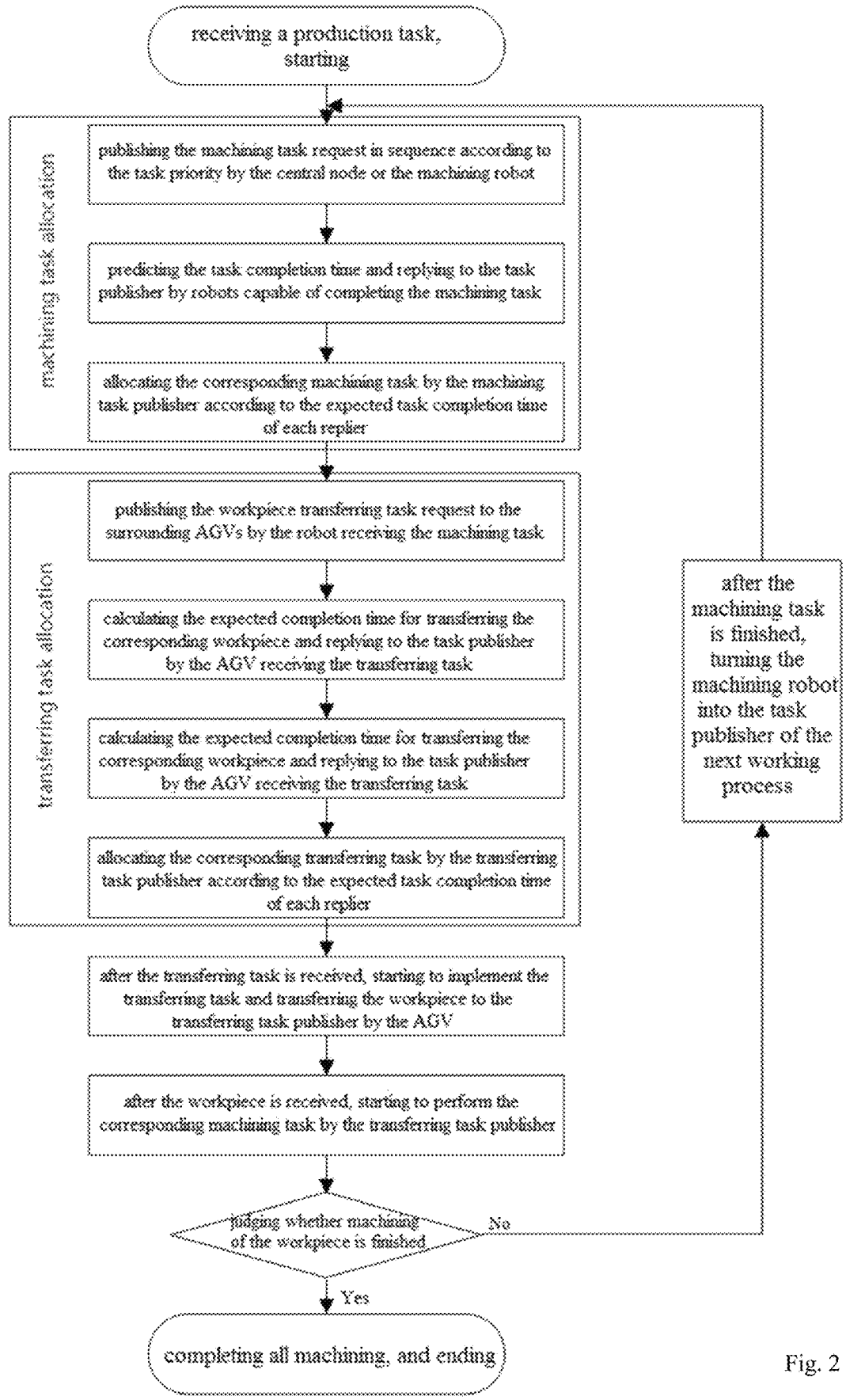
FIG. 2 is a multi-machining robot collaboration flow diagram of the present disclosure.

The multi-machining robot collaboration flow diagram of the present disclosure is shown in the FIG. 2. Multi-machining robot collaboration in the hardware workshop starts from the emergence of a new producing task, and after the various machining robots repeatedly implement the machining tasks, the transferring tasks and other steps, the multi-working process machining of the workpieces is completed.

Figure 3:
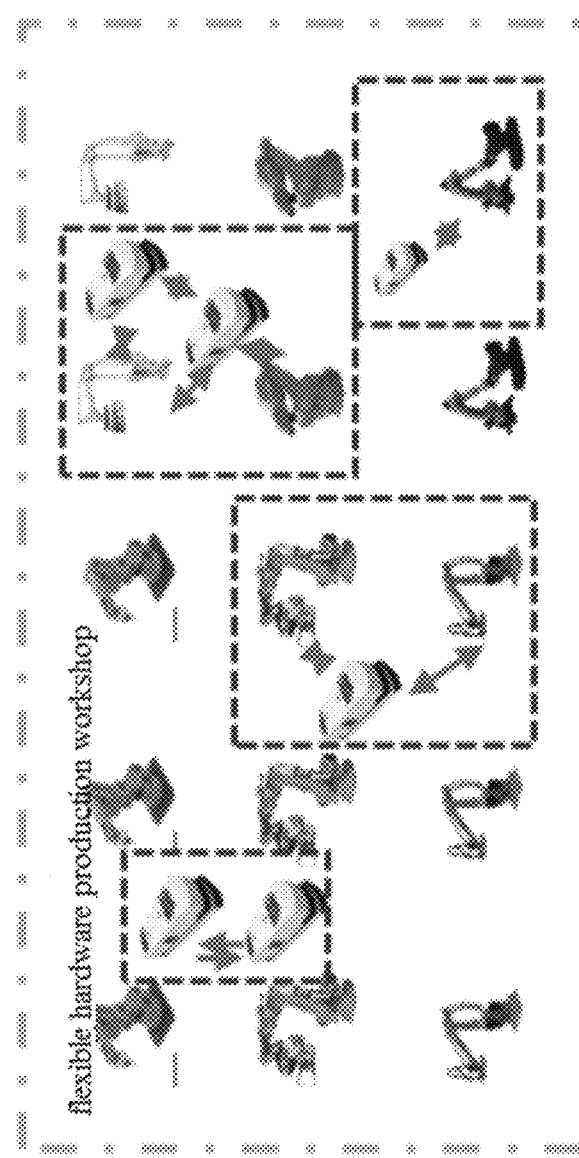
FIG. 3 is a control structure diagram for the flexible hardware workshop in the present disclosure.
Figure 3:
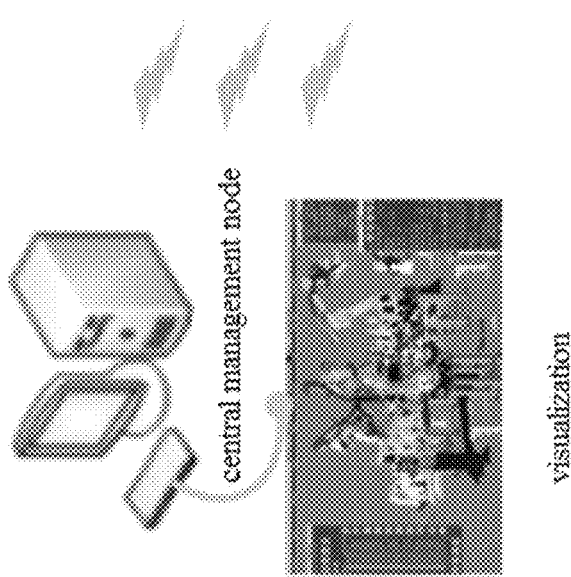

The abovementioned various machining robots and data links therebetween constitute the flexible hardware workshop, shown in the FIG. 3, which can be compatible with a centralized control working mode and a distributed collaborative working mode. The workshop takes local collaborative self-organization behaviors as main behavior modes, including the task allocating action, the various conflict and failure eliminating action and the like; then, the central management node supervises and manages the workshop production process from the upper level, supervises the working status of each machining robot and makes appropriate intervention so as to avoid occurrence of the large-scale congestion. The machining robots and the AGVs have the status perceiving, autonomous communicating and autonomous decision-making capabilities and the like. The status perceiving capability refers to the certain capability of perceiving and predicting the own status, the environmental status and the current task completion condition; the autonomous communicating capability refers to the capability of actively performing information sharing and communication with the other surrounding machining robots through the communication network; the autonomous decision-making capability refers to the capability of comprehensively analyzing the own status and the shared information and actively initiating the related tasks or responding to the task requests.

Figure 4:
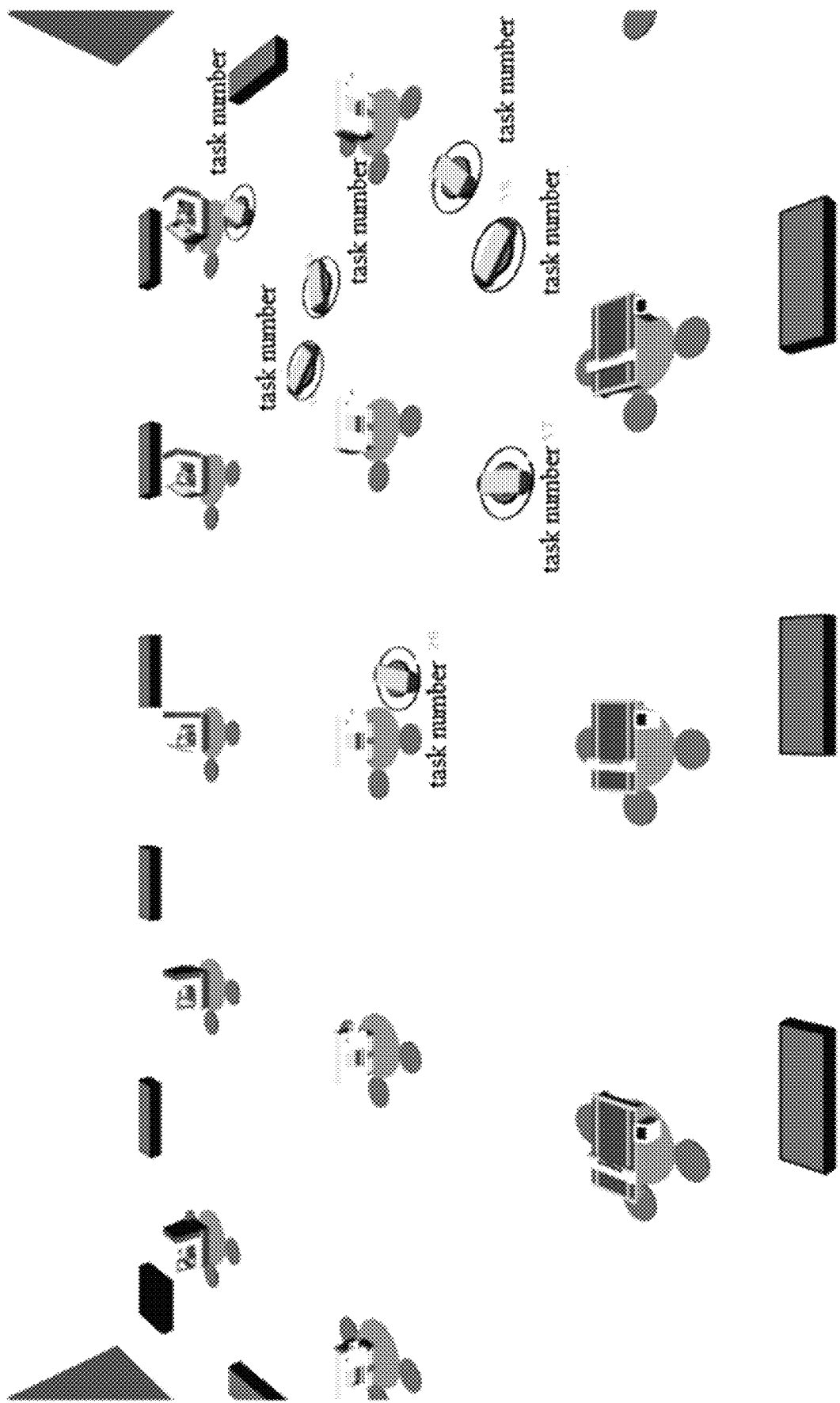
FIG. 4 is a simulation scene diagram for the flexible hardware workshop in the present disclosure.

The simulation scene diagram for the flexible hardware workshop in the present disclosure is shown in the FIG. 4. The flexible hardware workshop is organically composed of multiple modularized machining units, multiple AGVs and various corresponding supporting auxiliary equipment, and high-efficiency and flexible machining of the workpieces is achieved through the flexible transferring capability of the AGVs and the autonomous decision-making capability of the machining robots.

The flexible hardware workshop shown in the FIG. 4 can totally machine 3 different workpieces (J1, J2, J3), each workpiece needs to be machined in sequence according to 3 processes (PI, P2, P3), and the machining working processes of different workpieces are shown in Table 1; it is defined that there are altogether 6 machining robots in the workshop, each machining robot is responsible for the machining of a certain process, the machining time of the same process for different workpieces is different, and the specific parameters of the machining robots are shown in Table 2; it is defined that there are altogether 4 isostructural AGVs (A1, A2, A3, A4) in the workshop, each AGV can transfer different workpiece raw materials, semi-finished products and finished products; at present, there are still some machining tasks, which have not been completed, of other orders in the workshop. Hereby, a workpiece ID is defined as Tn. Each machining task can be represented by (Tn, Pm).

Key parameters of the workpieces and the machining robots in the workshop are shown in the table as follows:

TABLE 1

Workpiece varieties and working processes

| Workpiece variety | J1 | J2 | J3 |
|---|---|---|---|
| Machining working process | P1 -> P2 -> P3 | P2 -> P1 -> P3 | P1 -> P3 -> P2 |

TABLE 2

Key parameters of the machining robots

| | Machining robot variety | | | | | | | | | | | | | | | | | |
|---|---|---|---|---|---|---|---|---|---|---|---|---|---|---|---|---|---|---|
| | M11 | | | M12 | | | M21 | | | M22 | | | M31 | | | M32 | | |
| Quantity | 1 | | | 1 | | | 1 | | | 1 | | | 1 | | | 1 | | |
| Machining process | P1 | | | P1 | | | P2 | | | P2 | | | P3 | | | P3 | | |
| Machining variety | J1 | J2 | J3 | J1 | J2 | J3 | J1 | J2 | J3 | J1 | J2 | J3 | J1 | J2 | J3 | J1 | J2 | J3 |
| Machining time | 3 | 2 | 5 | 8 | 4 | 5 | 2 | 4 | 8 | 2 | 3 | 6 | 4 | 5 | 8 | 9 | 2 | 5 |

According to the multi-machining robot collaboration method provided by the present disclosure, the machining robot collaboration system is adopted for achieving collaboration; the communication strategy of the machining robot collaboration system meets the communication stability and rapidity requirements in various information exchange links in the multi-machining robot collaboration system; on the basis of the industrial field bus and other technologies, the multi-machining robot collaboration system gathers the status information of each machining robot to the central management node in real time and at a high speed and provides accurate and real-time information support for a centralized intervention and dispatching method. Each machining robot and each AGV realize flexible event-driven self-organizing behaviors in the wireless local area network environment, and the machining robots in the self-organizing area complete most of the tasks such as task allocation and conflict elimination through respective information sharing and information exchange.

The multi-machining robot collaboration method includes a machining task allocation method and a transferring task allocation method and can further include a multi-AGV path conflict eliminating method and a centralized intervention and dispatching method.

By the machining task allocation method, efficient entry of the raw materials or the semi-finished products into the machining flow of the next process is ensured.

The transferring tasks include the transferring task of the raw materials and the transferring task of the semi-finished products and the finished products, and by the transferring task allocation method, efficient transfer of the raw materials or the semi-finished products after completion of the working process is ensured, and thus the detention time of the workpieces is reduced.

By the multi-AGV path conflict eliminating method, AGV collision which may occur during movement is avoided.

The central management node realizes the prediction, intervention and management of the overall workshop production process from a global perspective by the centralized intervention and dispatching method.

The specific steps are as follows:

step 1, a workpiece machining task for machining a batch of workpieces is generated, and the batch of workpieces includes multiple different varieties of to-be-machined workpieces, shown in table 3;

TABLE 3

Parameter information of each workpiece in the order

| Workpiece ID | T11 | T12 | T13 | T14 | T15 | T16 | T17 |
|---|---|---|---|---|---|---|---|
| Workpiece variety | J2 | J3 | J3 | J2 | J1 | J1 | J2 |
| priority | 7 | 6 | 5 | 4 | 3 | 2 | 1 | step 2, according to the machining task priority, the central management node allocates the machining tasks to the machining robots in the workshop in sequence in a broadcasting form by, and a machining task allocation method mainly includes the following substeps:

step 2.1, (invocation) the central management node sends a workpiece machining task request to the machining robots in the workshop in sequence according to the task machining priority sequence of the information of a to-be-machined task;

step 2.2, (response) after the workpiece machining task request information is received, the machining robots predict a completion time of a corresponding task in the request information in combination with the task sequence in a current own task list and send the expected completion time of the task to the central management node. By taking the workpiece T11 as an example, the central management node sends the machining task (T11, P2) to all the machining robots, and correspondingly, the machining robots M21 and M22 capable of completing the process P2 will calculate the expected time of the (T11, P2) according to the tasks to be completed in the current task list and the machining time of the workpiece T11 and send the expected time to the central management node, which is shown in Table 4;

TABLE 4

The expected completion time of each machining robot for (T11, P2)

| Machining robot | M21 | M22 |
|---|---|---|
| Expected completion time for the task (T11, P2) | 84 | 91 | step 2.3, (confirmation) the central management node allocates a task package to the machining robot feeding back the shortest expected completion time in priority according to the feedback information of each machining robot and sends corresponding confirmation information to the machining robot. According to the table 4, the machining task (T11, P2) is completed by M21;

step 2.4, (completion) after the confirmation information is received, the machining robot inserts the task into the task list according to the priority sequence and recalculates the expected completion time of each task; the machining robots which do not receive the confirmation information maintain the original statuses. Before and after the M21 receives the task T11, the task lists are as follows:

TABLE 5

| M21 task list updating diagram | | | | | | | | | | |
|---|---|---|---|---|---|---|---|---|---|---|
| Original M21task list | T1 | T3 | T2 | T4 | T5 | T7 | T8 | T6 | T9 | T10 |
| Priority | 8 | 8 | 6 | 6 | 6 | 5 | 4 | 4 | 3 | 1 |
| Expected completion time | 72 | 80 | 84 | 88 | 90 | 98 | 106 | 110 | 114 | 122 |
| Current M21 task list | T1 | T3 | T11 | T2 | T4 | T5 | T7 | T8 | T6 | T9 | T10 |
| Priority | 8 | 8 | 7 | 6 | 6 | 6 | 5 | 4 | 4 | 3 | 1 |
| Expected completion time | 72 | 80 | 84 | 88 | 92 | 94 | 102 | 110 | 114 | 118 | 126 | step 3, the workpieces to be machined are gathered in sequence by the M21 according to the machining task priority sequence, wherein a transferring task allocation method includes the following substeps:

step 3.1, (invocation) the M21 reads the machining task in the own task list and sends the transferring request information of the task to surrounding AGVs through the local communication network;

step 3.2, (response) after the transferring request information is received, idle AGVs (taking A2, A3, and A4 as examples) in the local communication network calculate the expected completion time of the transferring task according to own position information, material-taking position information and material-sending position information and the like and send the expected time as return information to the M21. It is now assumed that the numbers of the idle AGVs that receive the request in the workshop and the expected completion time of the transferring task are shown in the table below:

TABLE 6

The completion time of the idle AGVs for the transferring task T1

| Idle AGV number | A2 | A3 | A4 |
|---|---|---|---|
| Expected completion time for the transferring task T1 | 68 | 62 | 59 | step 3.3, (confirmation) the machining robot preferentially selects the AGV feeding back the shortest completion time according to the fed-back response information and sends confirmation information to the AGV;

step 3.4, (implementation) after the confirmation information is received, the AGV transfers the material to be machined from a discharging buffer zone of the machining robot in the previous working process to a feeding buffer zone of the corresponding machining robot in the current working process according to the task information; the AGVs which do not receive the confirmation information within a certain period of time continue to wait for receiving other transferring task requests;

step 4, after the workpiece to be machined is received, the machining robot starts to machine the workpiece according to the corresponding working process, and after the machining robot completes the machining task in the working process, the machining robot performs the next machining task allocation operation, and the machining task allocation operation includes the following substeps:

step 4.1, (judgment) whether all the machining working processes of the machined workpiece are completed is judged; if so, a step 5 is executed, namely an AGV is invoked to transfer the workpiece to a finished product zone for warehousing and the machining task is ended; otherwise, the workpiece machining task request in the next working process is sent to other surrounding machining robots;

step 4.2, (invocation) the machining robot sends a workpiece machining task request to the other machining robots in the workshop in sequence according to the task machining priority sequence of the information of the to-be-machined task;

step 4.3, (response) after the workpiece machining task request information is received, the machining robot capable of completing the machining task in the working process predicts the completion time of the corresponding task in the request information in combination with the task sequence in the current own task list and sends the expected completion time of the task to a task request sender;

step 4.4, (confirmation) the sender allocates the task package to the machining robot feeding back the shortest completion time in priority according to the feedback information of each machining robot and sends corresponding confirmation information to the machining robot;

step 4.5, (completion) after the confirmation information is received, the machining robot inserts the task into the task list according to the priority sequence and recalculates the expected completion time of each task, and the operation returns to the step 3;

step 5, after the last workpiece machining working process is completed, the machining robot completes the workpiece warehousing transferring task allocation, and workpiece warehousing transferring task allocation includes the following substeps:

step 5.1, (invocation) the machining robot sends a workpiece warehousing transferring request to surrounding AGVs through the local communication network;

step 5.2, (response) after the transferring request information is received, idle AGVs in the local communication network calculate the expected completion time of the transferring task according to own position information, material-taking position information and material-sending position information and the like and send the expected time as return information to the task sender;

step 5.3, (confirmation) the machining robot preferentially selects the AGV feeding back the shortest completion time according to the fed-back response information and sends confirmation information to the AGV;

step 5.4, (implementation) after the confirmation information is received, the AGV autonomously transfers the finished workpiece to a finished product zone according to the task information, and all machining tasks of the workpiece are ultimately completed.

During the operation of the flexible machining workshop, multiple AGVs may encounter path conflicts or even congestion problems due to the limited workshop space. In order to avoid occurrence of such problems, each AGV and the central management node in the workshop should implement the step 6 and the step 7 respectively.

Figure 5:
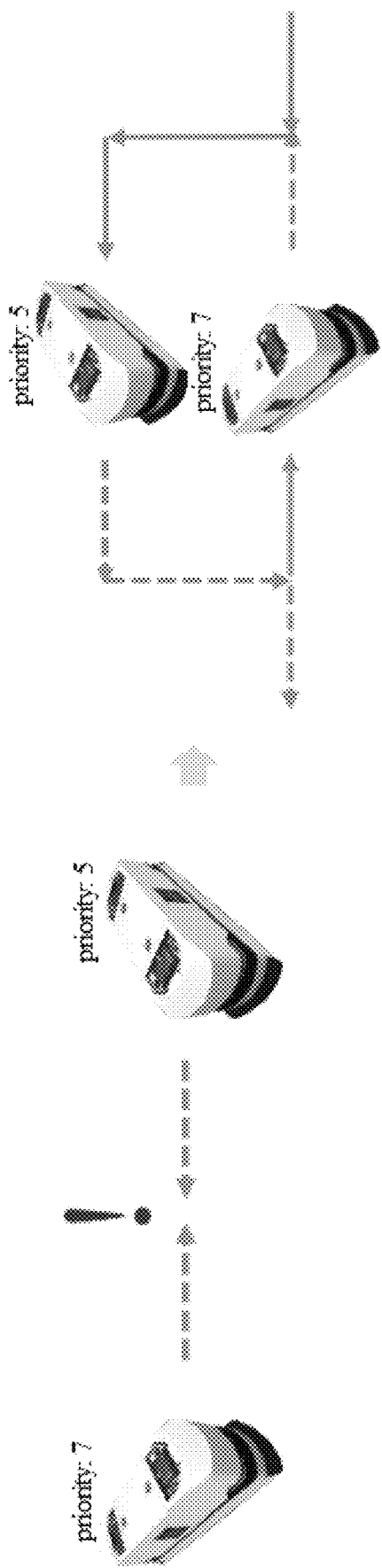
FIG. 5 is an AGV path conflict solving schematic diagram of the present disclosure.

When a small number of AGVs encounter path conflicts, according to the task priority information, the path conflicts can be relieved through convenient local self-organizing negotiation. As shown in the FIG. 5, in order to solve the following path conflict problems of a small number of AGVs, the following steps can be taken:

step 6.1, (sharing) during movement, the AGV in the flexible production workshop shares own position information and partial path information and own task priority information with the surrounding AGVs through the local communication network;

step 6.2, (prediction) after the AGV receives the shared information from the surrounding AGVs, the AGV compares the shared information with the own position information and path information so as to judge whether a path conflict problem appears;

step 6.3, (treatment) if the path conflict problem appears between the AGV itself and another AGV, the respective task priority sequences are firstly judged; if the priority of the AGV itself is higher than that of another AGV, the conflict problem is ignored; if the priority of the AGV itself is lower than that of another AGV, an avoiding measure is taken to let the AGV with the higher priority pass through a path with a conflict.

For the flexible production workshop responsible for a large number of multi-variety workpiece machining tasks, a long time is taken for planning production schemes for all production tasks by the centralized dispatching method and the production workshop with a complex environment is prone to emergencies, so that only the centralized intervention method is used in the present disclosure for predicting, intervening and adjusting the emergencies in the workshop.

The central management node will perform the following monitoring and analyzing steps and the like.

step 7.1, (monitoring) the central management node collects the status information of all the machining robots and all the AGVs and the environmental condition from the inside of the workshop in real time through an industrial field bus;

step 7.2, (analysis) centralized analysis and processing is performed on the information collected in the step 7.1 so as to discover and predict workshop failures which are occurring or likely to occur in the future, and the failures include machining robot failures, sudden obstacles and vehicle congestion in the workshop;

step 7.3, (adjustment) according to the result of the step 7.2, the central management node adopts a high-efficiency dispatching strategy for reasonably adjusting the internal parameters, a task list and the current status and other information of each current machining robot so as to change the production and operation status of the workshop in a minimum range under the premise of successfully eliminating the workshop failures which are occurring or likely to occur in the future.

Figure 6:
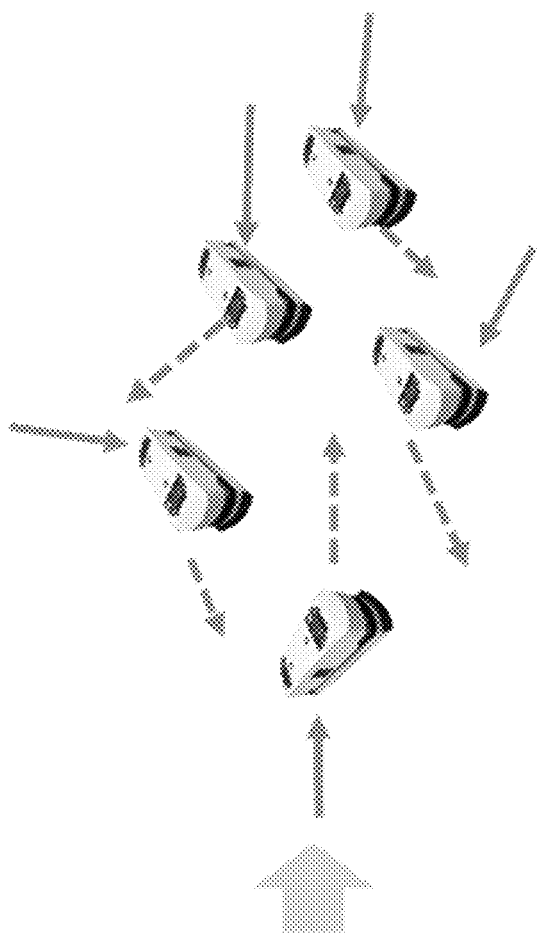
FIG. 6 is an AGV congestion solving schematic diagram of the present disclosure.
Figure 6:
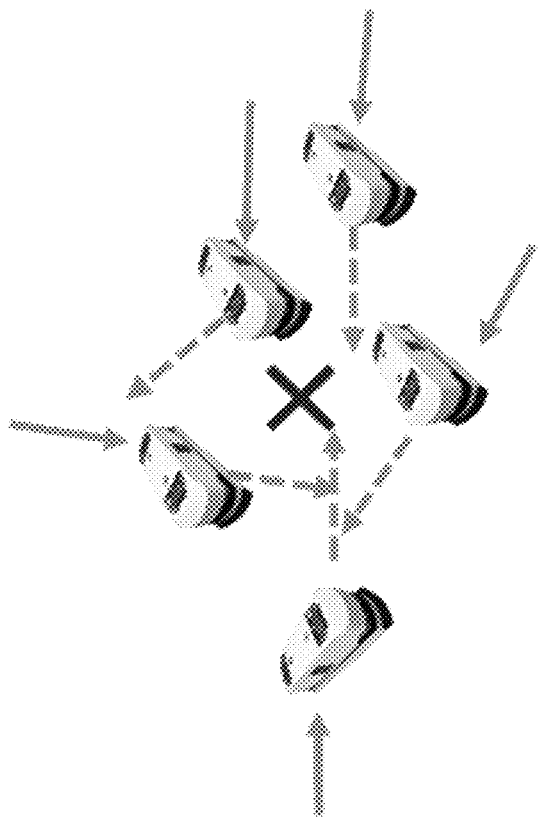

For example, when large-scale AGV task congestion occurs, path conflict elimination is difficultly achieved through local negotiation. In order to solve such congestion situation, the central management node needs to perform real-time supervision and timely prediction and intervention, which is shown in the FIG. 6, so as to fully predict and intervene the operation conditions of the AGVs and the machining robots and avoid congestion and other similar problems.

In summary, the above description is only a preferred embodiment of the present disclosure and is not used for limiting the protection scope of the present disclosure; any modification, equivalent replacement, improvement and the like within the spirit and the principle of the present disclosure shall be included in the protection scope of the present disclosure.

What is claimed is:

1. A multi-machining robot collaboration method in a flexible hardware production workshop, wherein a machining robot collaboration system is adopted for achieving collaboration, the multi-machining robot collaboration system gathers status information of each machining robot to a central management node in real time by using a bus; each machining robot and AGVs realize event-driven communication and information sharing in a wireless local area network environment so as to complete task allocation, the multi-machining robot collaboration method comprising:

step 1, generating a workpiece machining task for machining a batch of workpieces, wherein the batch of workpieces comprises multiple different varieties of to-be-machined workpieces;

step 2, performing machining task allocation by the central management node, which comprises:

step 2.1, sending a workpiece machining task request to the other machining robots in sequence by a machining task sender according to a task machining priority sequence of the information of a to-be-machined task through a communication network;

step 2.2, after the workpiece machining task request information is received, predicting a completion time of a corresponding task in the request information in combination with the task sequence in a current own task list and sending the expected completion time of the task to the machining task sender by the machining robots;

step 2.3, allocating a task package to the machining robot feeding back the shortest expected completion time in priority according to the feedback information of each machining robot and sending corresponding confirmation information to the machining robot by the machining task sender; and step 2.4, after the confirmation information is received, inserting the task into the task list according to the priority sequence and recalculating the expected completion time of each task by the machining robot, wherein the machining robots which do not receive the confirmation information maintain original statuses;

step 3, gathering the workpieces to be machined in sequence according to the machining task priority sequence, which comprises:

step 3.1, reading the machining task in the task list and sending transferring request information of the task to surrounding AGVs through a local communication network by the machining robot;

step 3.2, after the transferring request information is received, calculating an expected completion time of the transferring task according to own position information, material-taking position information and material-sending position information and sending the expected time as return information to the task sender by the idle AGVs in the local communication network;

step 3.3, preferentially selecting the AGV feeding back the shortest expected completion time according to the fed-back response information and sending confirmation information to the AGV by the machining robot; and step 3.4, after the confirmation information is received, transferring the material to be machined from a discharging buffer zone of the machining robot in the previous working process to a feeding buffer zone of the corresponding machining robot in the current working process by the AGV according to the task information, wherein the AGVs which do not receive the confirmation information within a certain period of time continue to wait for receiving other transferring task requests;

step 4, after the workpiece to be machined is received, starting to machine the workpiece according to the corresponding working process by the machining robot, and after the machining robot completes the machining task in the working process, performing the next machining task allocation operation, which comprises:

step 4.1, judging whether all the machining working processes of the machined workpiece are completed; if so, executing a step 5, namely collecting the AGV to transfer the workpiece to a finished product zone for warehousing and ending the machining task; otherwise, sending a workpiece machining task request for the next working process to other surrounding machining robots;

step 4.2, sending a workpiece machining task request to the other machining robots in the workshop in sequence according to the task machining priority sequence of the information of the to-be-machined task by the machining robot;

step 4.3, after the workpiece machining task request information is received, predicting the completion time of the corresponding task in the request information in combination with the task sequence in the current own task list and sending the expected completion time of the task to a task request sender by the machining robot capable of completing the machining task in the working process;

step 4.4, allocating the task package to the machining robot feeding back the shortest completion time in priority according to the feedback information of each machining robot and sending corresponding confirmation information to the machining robot by the sender; and step 4.5, after the confirmation information is received, inserting the task into the task list according to the priority sequence and recalculating the expected completion time of each task by the machining robot, and going to the step 3;

step 5, after the last workpiece machining working process is completed, completing workpiece warehousing transferring task allocation by the machining robot, wherein workpiece warehousing transferring task allocation comprises the following substeps:

step 5.1, sending a workpiece warehousing transferring request to surrounding AGVs through the local communication network by the machining robot;

step 5.2, after the transferring request information is received, calculating the expected completion time of the transferring task according to own position information, material-taking position information and material-sending position information and sending the expected time as return information to the task sender by the idle AGVs in the local communication network;

step 5.3, preferentially selecting the AGV feeding back the shortest completion time according to the fed-back response information and sending confirmation information to the AGV by the machining robot; and step 5.4, after the confirmation information is received, autonomously transferring the finished workpiece to a finished product zone according to the task information by the AGV to complete all the machining tasks of the workpiece.

2. The multi-machining robot collaboration method in the flexible hardware production workshop according to claim 1, further comprising a multi-AGV path conflict eliminating method, wherein the multi-AGV path conflict eliminating method comprises the following substeps:

step 6.1, sharing own position information, partial path information and own task priority information with the surrounding AGVs through the local communication network by the AGV in the flexible production workshop during movement; and step 6.2, after the shared information from the surrounding AGVs is received, comparing the shared information with the own position information and path information by the AGV so as to judge whether a path conflict problem appears;

if the path conflict problem appears between the AGV itself and another AGV, firstly judging the respective task priority sequences; if the priority of the AGV itself is higher than that of another AGV, ignoring the conflict problem; if the priority of the AGV itself is lower than that of another AGV, taking an avoiding measure to let the AGV with the higher priority pass through a path with a conflict.

3. The multi-machining robot collaboration method in the flexible hardware production workshop according to claim 1, wherein adopting a centralized intervention and dispatching method for discovering and predicting system conflicts and failure problems comprises the following substeps:

step 7.1, collecting information from the inside of the workshop in real time by the central management node through an industrial field bus, wherein the information comprises the status information of all the machining robots and all the AGVs and the environmental condition;

step 7.2, performing centralized analysis and processing on the information collected in the step 7.1 so as to discover and predict workshop failures which are occurring or likely to occur in the future, wherein the failures comprise machining robot failures in the workshop, obstacles in the workshop and traffic congestion; and step 7.3, according to the result of the step 7.2, adopting a dispatching strategy by the central management node for adjusting internal parameters, a task list and current status information of each current intelligent agent so as to eliminate the workshop failures which are occurring or likely to occur in the future by changing the production and operation status of the workshop in a minimum range.

4. The multi-machining robot collaboration method in the flexible hardware production workshop according to claim 2, wherein adopting a centralized intervention and dispatching method for discovering and predicting system conflicts and failure problems comprises the following substeps:

step 7.1, collecting information from the inside of the workshop in real time by the central management node through an industrial field bus, wherein the information comprises the status information of all the machining robots and all the AGVs and the environmental condition;

step 7.2, performing centralized analysis and processing on the information collected in the step 7.1 so as to discover and predict workshop failures which are occurring or likely to occur in the future, wherein the failures comprise machining robot failures in the workshop, obstacles in the workshop and traffic congestion; and step 7.3, according to the result of the step 7.2, adopting a dispatching strategy by the central management node for adjusting internal parameters, a task list and current status information of each current intelligent agent so as to eliminate the workshop failures which are occurring or likely to occur in the future by changing the production and operation status of the workshop in a minimum range.

5. The multi-machining robot collaboration method in the flexible hardware production workshop according to claim 1, wherein the machining task sender is the central management node or the machining robot.

* * * * *